United States Patent

Lipp

[11] Patent Number: 5,555,919
[45] Date of Patent: Sep. 17, 1996

[54] HYDRAULIC FILLING DEVICE FOR WEAPON RECOIL BRAKES AND/OR COUNTER RECIL MECHANISMS

[75] Inventor: Herbert Lipp, Duesseldorf, Germany

[73] Assignee: Rheinmetall Industrie GmbH, Ratigen, Germany

[21] Appl. No.: 368,588

[22] Filed: Jan. 5, 1995

[30] Foreign Application Priority Data

Jan. 7, 1994 [DE] Germany .......................... 44 00 325.0

[51] Int. Cl.⁶ ................. F41A 25/02; F15B 1/00
[52] U.S. Cl. ............... 141/59; 141/98; 141/290; 188/352
[58] Field of Search ................. 141/4, 5, 7, 59, 141/98, 290; 184/1.5; 188/352

[56] References Cited

U.S. PATENT DOCUMENTS

| | | | |
|---|---|---|---|
| 2,295,539 | 9/1942 | Beach | 184/1.5 X |
| 5,060,703 | 10/1991 | Koerner | 141/59 |
| 5,088,529 | 2/1992 | Jones et al. | 141/59 |
| 5,318,080 | 6/1994 | Viken | 141/98 |
| 5,447,184 | 9/1995 | Betancourt | 141/98 |

FOREIGN PATENT DOCUMENTS 3733215 4/1989 Germany .

*Primary Examiner*—J. Casimer Jacyna
*Attorney, Agent, or Firm*—Spencer & Frank

[57] ABSTRACT

A hydraulic filling device for filling control elements with a hydraulic fluid. The device has a tank that contains the hydraulic fluid and, a pump and the hydraulic control element to be filled is always provided with a filling connection and a ventilation connection so that the device is connectible to the filling connection of the hydraulic control element to be filled. The tank of the filling device containing the hydraulic fluid is connectible to the ventilation connection of the control element to be filled by way of a ventilation line.

7 Claims, 1 Drawing Sheet

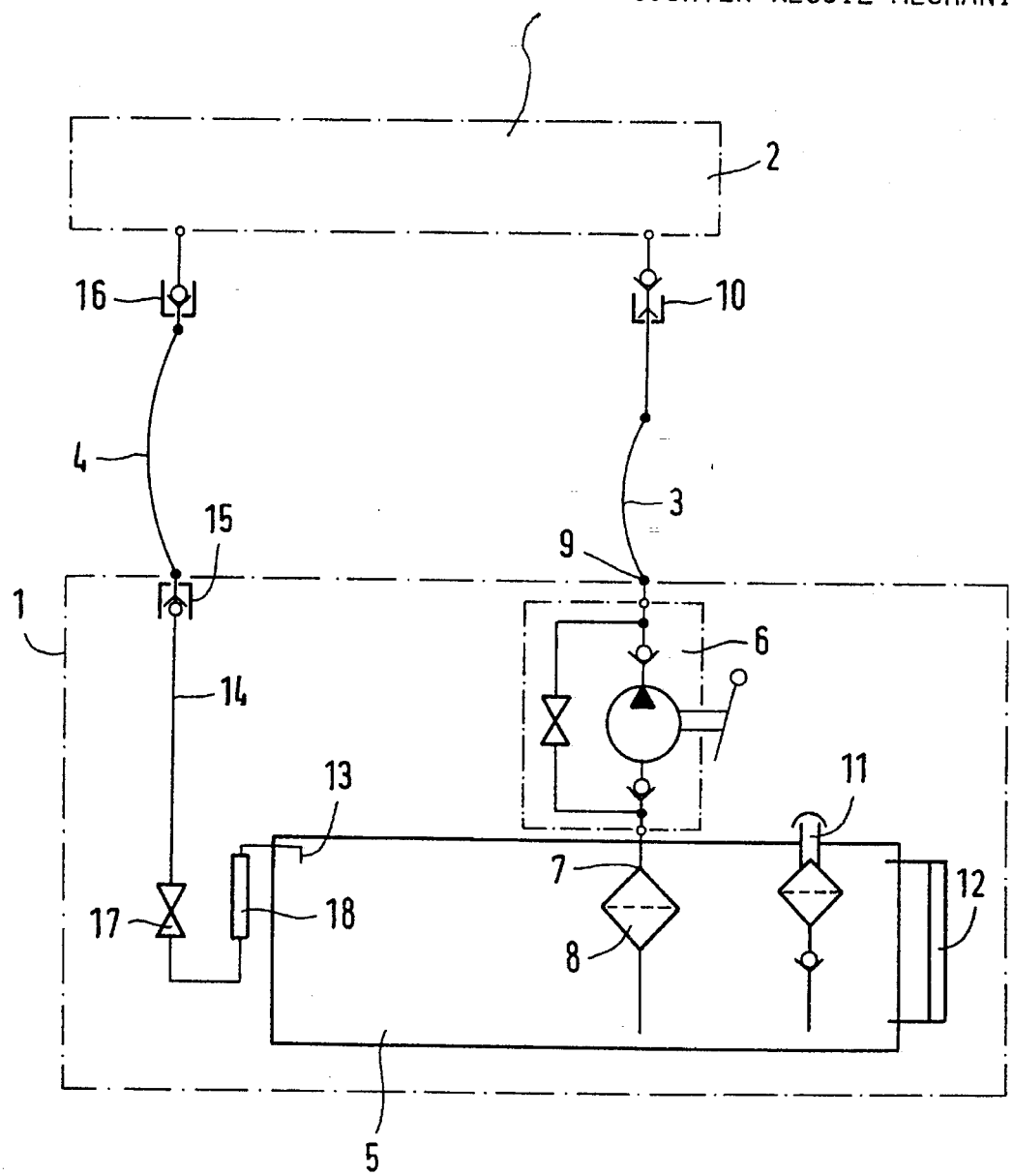

5,555,919

HYDRAULIC FILLING DEVICE FOR WEAPON RECOIL BRAKES AND/OR COUNTER RECIL MECHANISMS

CROSS REFERENCE TO RELATED APPLICATION

This application claims the priority of German application P 4400325.0 filed Jan. 7, 1994, the subject matter of which is incorporated herein by reference.

BACKGROUND OF THE INVENTION

The present invention relates to a hydraulic filling device for filling hydraulic control elements with a hydraulic fluid, such device having a tank that contains the hydraulic fluid, a pump, and a filling connection as well as a ventilation connection. The device is connectible to the filling connection of the hydraulic element to be filled and a ventilation line is connected to the ventilation connection of the control element to be filled.

The device is suitable for use with a piece of artillery having weapon recoil brakes and a weapon counterrecoil mechanism for filling and ventilating such weapon recoil brakes and weapon counterrecoil mechanisms.

Filling devices of this type are known per se, and serve in initial or maintenance filling of hydraulic control elements, for example hydraulic vehicle brakes, or weapon recoil brakes or weapon counterrecoil mechanisms in artillery weapons. The filling device in these cases essentially comprises a tank containing the hydraulic fluid, a pump having a filling line, and possibly a control apparatus, as is shown, for example, in DE 37 33 215 A1.

Air locks in the oil chamber of hydraulic control elements are frequently responsible for their malfunction. For example, air locks in the oil chamber of weapon recoil brakes or corresponding weapon counterrecoil mechanisms cause uncontrollable pressure increases when the barrel recoils and buffeting when the barrel moves forward. The hydraulic control elements must therefore typically be filled with the corresponding hydraulic fluid (e.g., oil) in an air-free manner, i.e., the control elements must be thoroughly ventilated during the filling process and thereafter.

it is known to ventilate the control elements manually. For this purpose, a ventilation connection is located on the respective control element, and a ventilation hose is secured to the ventilating connection. During the ventilation process, the end of the ventilation hose facing away from the ventilation connection hangs in a typically open container, such as a bucket, a can or the like.

The disadvantage of this known manual ventilation is that the exiting hydraulic oil foams as it sprays into the open container. Thus, there exists the danger that the maintenance personnel will be soiled with oil and, in addition the environment will be damaged. Another danger is that of impairment of the health of the maintenance personnel, because the oil is slightly toxic. The hydraulic oil which is removed must later be cleaned by using a filter system, and can only then be re-supplied to the hydraulic element. However, usually the oil removed during the ventilation process is not conveyed back to the kettle but is decontaminated in a relatively expensive manner.

SUMMARY OF THE INVENTION

It is an object of the invention to overcome the above drawbacks by refining the filling device of the above type in a simple way such that, during ventilation of corresponding hydraulic control elements, no soiling occurs that would damage the environment due to the hydraulic fluid spraying out. Moreover, no threats to the health of the maintenance personnel will not be threatened during the ventilation.

This object is accomplished by making the tank of the filling device containing the hydraulic fluid connectible to the ventilation connection of the control element by way of a ventilation line.

The essential concept underlying the invention is to avoid guiding the ventilation hose into an open container, as has been the practice up to now, but instead to connect it with the tank of the filling device. Then, during ventilation of the respective control element, the foam of the hydraulic fluid flows back directly into the tank of the filling device by way of the ventilation hose. This hydraulic fluid can be re-supplied to the control element as the filling process continues.

BRIEF DESCRIPTION OF THE DRAWING

The sole FIGURE illustrates a preferred embodiment of the invention.

DESCRIPTION OF THE PREFERRED EMBODIMENT

The FIGURE shows a filling device according the invention which is indicated by 1, and a hydraulic control element known per se that is to be filled, for example, the recoil brake or counter recoil mechanism of a piece of artillery indicated by 2. Filling device 1 and weapon recoil brake 2 are connected to one another by way of a filling hose 3 and a ventilation hose 4.

The filling device 1 comprises a tank 5 filled at least partially with hydraulic oil, and a pump 6. The pump 6 can, for example, be a manual reciprocating pump. A suction pipe 7 that projects into tank 5 and has a suction filter 8 is disposed at the suction connection of pump 6, and the pressure connection of the pump is connected to a filling connection 9 of the filling device 1. The filling hose 3 is secured between this filling connection 9 and a corresponding filling connection 10 at the recoil brake 2.

The tank 5 of the filling device 1 includes a filling and ventilation filter 11, and has an oil status display 12 for checking the oil status. Furthermore, one end 13 of a ventilation line 14 projects into tank 5. The corresponding other end of the ventilation line 14 is connected to a ventilation connection 15 of the filling device 1o The ventilation hose 4 is secured between this connection 15 and a ventilation connection 16 of the recoil brake 2.

The ventilation line also incorporates a shut-off valve 17 and a ventilation viewing glass 18.

The following is a description of the function of the filling device 1, for example, during a maintenance filling.

The filling device 1 is connected to recoil brake 2 with the aid of the filling hose 3 and the ventilation hose 4. The shut-off valve 17 initially remains closed. The recoil brake 2 is then filled with hydraulic oil by operation of the manual reciprocating pump 6, as a result of which the air located in recoil brake 2 is compressed. After the shut-off valve 17 is opened, the recoil brake 2 is ventilated into the tank 5 by way of the ventilation hose 4 and the ventilation line 14. The ventilation status can be checked using the ventilation viewing glass 18.

To ensure complete ventilation, the "fill/ventilate" process will normally need to be repeated a number of times until no more air bubbles are seen in the ventilation viewing glass.

It will be understood that the above description of the present invention is susceptible to various modifications, changes and adaptations, and the same are intended to be comprehended within the meaning and range of equivalents of the appended claims.

What is claimed is:

1. A hydraulic filling device for filling hydraulic control elements for recoil brakes and counter recoil mechanisms of a piece of artillery with the hydraulic control elements each having a respective filling connection and a ventilation connection, with a hydraulic fluid, the filling device comprising a tank that contains the hydraulic fluid, a pump for pumping the hydraulic fluid from said tank and connectible to the filling connection of a respective hydraulic control element to be filled, and a ventilation line for connecting said tank of the filling device containing the hydraulic fluid to the ventilation connection of the respective control element to be filled.

2. A hydraulic filling device as defined in claim 1, further comprises a ventilation viewing glass disposed in the ventilation line in order to check the ventilation status of the hydraulic control element.

3. A hydraulic filling device as defined in claim 1, further comprising a shut-off valve disposed in the ventilation line.

4. In combination with a hydraulic weapon recoil brake mechanism, having a filling connection and a ventilation connection, of a piece of artillery, a hydraulic filling device for filling the weapon recoil brake with a hydraulic fluid, said filling device comprising a tank that contains the hydraulic fluid, a pump for pumping the hydraulic fluid from the tank connected to the filling connection of the hydraulic weapon brake, a ventilation line connecting said tank containing the hydraulic fluid to said ventilation connection of said weapon recoil brake, and a ventilation viewing glass disposed in the ventilation line in order to check the ventilation status of the hydraulic weapon brake.

5. The combination defined in claim 4, further comprising a shut-off valve disposed in the ventilation line.

6. In combination with a hydraulic weapon counter recoil mechanism, having a filling connection and a ventilation connection, of a piece of artillery, a hydraulic filling device for filling the weapon counter recoil mechanism with a hydraulic fluid, said filling device comprising a tank that contains the hydraulic fluid, a pump for pumping the hydraulic fluid from the tank connected to the filling connection of the hydraulic counter recoil mechanism, a ventilation line connecting said tank containing the hydraulic fluid to said ventilation connection of said weapon counter recoil mechanism, and a ventilation viewing glass disposed in the ventilation line in order to check the ventilation status of the hydraulic counter recoil mechanism.

7. The combination defined in claim 6, further comprising a shut-off valve disposed in the ventilation line.

* * * * *